TELEPHONE SYSTEM

Filed Sept. 22, 1953 4 Sheets-Sheet 1

INVENTORS,
CHARLES R. FISHER JR.
WILLIAM W. PHARIS
BY
*[signature]*
ATTORNEY

May 14, 1957 W. W. PHARIS ET AL 2,792,451

TELEPHONE SYSTEM

Filed Sept. 22, 1953 4 Sheets-Sheet 2

TELEPHONE SYSTEM

Filed Sept. 22, 1953 4 Sheets-Sheet 3

2,792,451

TELEPHONE SYSTEM

William W. Pharis and Charles R. Fisher, Jr., Rochester, N. Y., assignors, by mesne assignments, to General Dynamics Corporation, a corporation of Delaware Application September 22, 1953, Serial No. 381,609

6 Claims. (Cl. 179—18)

The present invention relates to telephone systems and more particularly to improvements in the supervisory signaling arrangements and circuits providing connections over trunk lines between local and distant exchanges.

The complexities of modern telephone systems employing automatic dial switching apparatus and the like require different forms of supervisory signaling arrangements for indicating the various conditions encountered in the functioning of the system. Most automatic telephone systems are arranged to operate over trunk lines between local and distant exchanges and also provide for extending connections to and from other distant telephone systems by means of toll operator switchboards and the like. In one type of telephone system to which this invention relates, a trunk circuit may be provided having two points of access from a toll operator or from so-called free service local subscribers, respectively. The trunk circuit at the distant exchange end of the trunk line is arranged to provide two different supervisory signaling functions indicative of answer supervision or busy conditions. At the same time, only one particular form of supervisory signaling may be provided over the trunk line between the local and distant trunk circuits to be indicative of either of the two forms of supervisory signals in the distant exchange.

When the call originates from a local subscriber over the local trunk circuit to the distant trunk circuit, supervision signaling indicative of answering conditons only is required over the trunk line in order to collect a coin if the local subscriber is a paystation or the like. Such answer supervision signal customarily originates over the talking conductors of the succeeding circuits. In such a situation, if a busy condition is encountered in the distant exchange, busy tone will be returned over the talking conductors to notify the subscriber of such busy condition.

On the other hand, when a call originating in the local exchange is from a toll operator at the local exchange, supervision signaling over the trunk line in the form of a so-called flashing signal would be required to recall the toll operator in the event a busy condition is encountered in the succeeding circuits. It is not desirable to originate the flashing busy signal over the talking conductors in the distant exchange because of the obvious confusion of such a signal with the previously mentioned answer supervision signal as used when the call originates from the local free service subscriber in the local exchange. It should be apparent that such a confusion of signaling would possibly result in the collection of a coin from a local paystation subscriber when a busy condition was encountered since such signal would be at first the same as the aforesaid answer supervision signal.

To overcome the above difficulties it is the primary object of this invention to provide an improved arrangement of supervisory signaling employing a common signaling means over the trunk line between local and distant exchanges and operating such supervisory signaling means selectively from two different sources of supervisory signals in the distant exchange depending upon the origin of the call in the local exchange.

A feature of the invention, as specifically applied to a loop form of trunk line connecting local and distant exchanges, is the provision of means to reverse the polarity of battery connections over the trunk line for supervisory signaling purposes together with means to control the aforesaid reversal of battery which may be selectively connected to respond to either a supervisory signal originating over the talking conductors of the succeeding circuits in the distant exchange, or a flashing supervisory signal originating over a conductor or conductors exclusive of the talking conductors. Therefore, in such an arrangement, the supervisory signal utilizing the talking conductors of the succeeding circuits is indicative of answer supervision only, while the flashing supervisory signal utilizing the conductor exclusive of the talking conductors is indicative of a busy condition.

Another feature of the invention in providing the aforementioned objective is the arrangement of a trunk circuit having first and second points of access connecting with local subscribers and a toll operator, respectively, together with means responsive to the seizure of the trunk circuit over the toll operator access only for sending a momentary signaling impulse over the trunk line upon seizure of the distant trunk circuit. In this connection the distant trunk circuit is provided with means responsive to the aforesaid momentary impulse on seizure to selectively switch the trunk line supervisory signal controlling relay to respond to a selected one of the previously mentioned two forms of supervisory signal originating in succeeding circuits.

Further objects, features and the attending advantages will be apparent with reference to the following specification and drawings in which—

Figure 2:
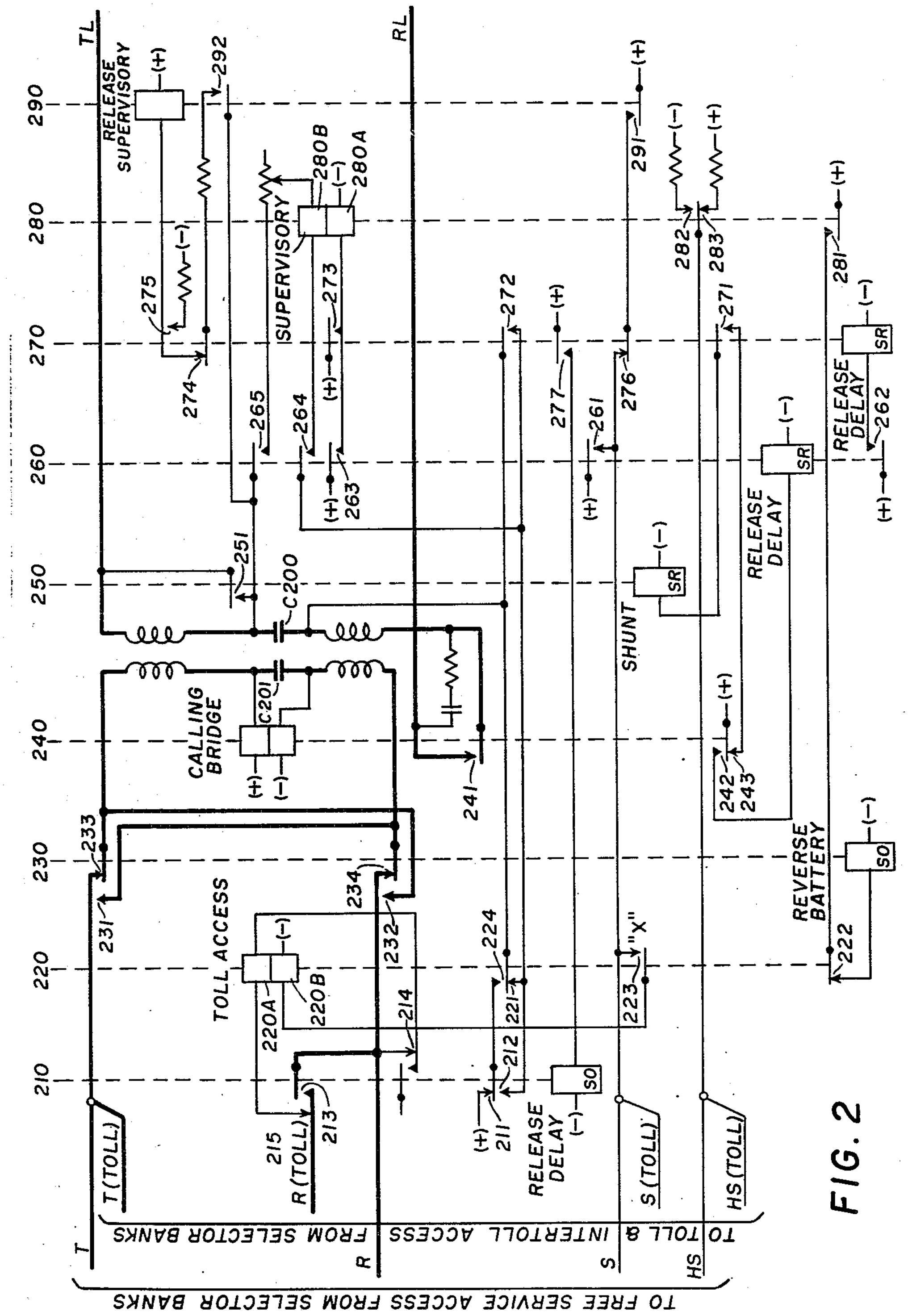
Fig. 2 is a circuit diagram of the trunk circuit in the local exchange having two points of access.
Figure 3:
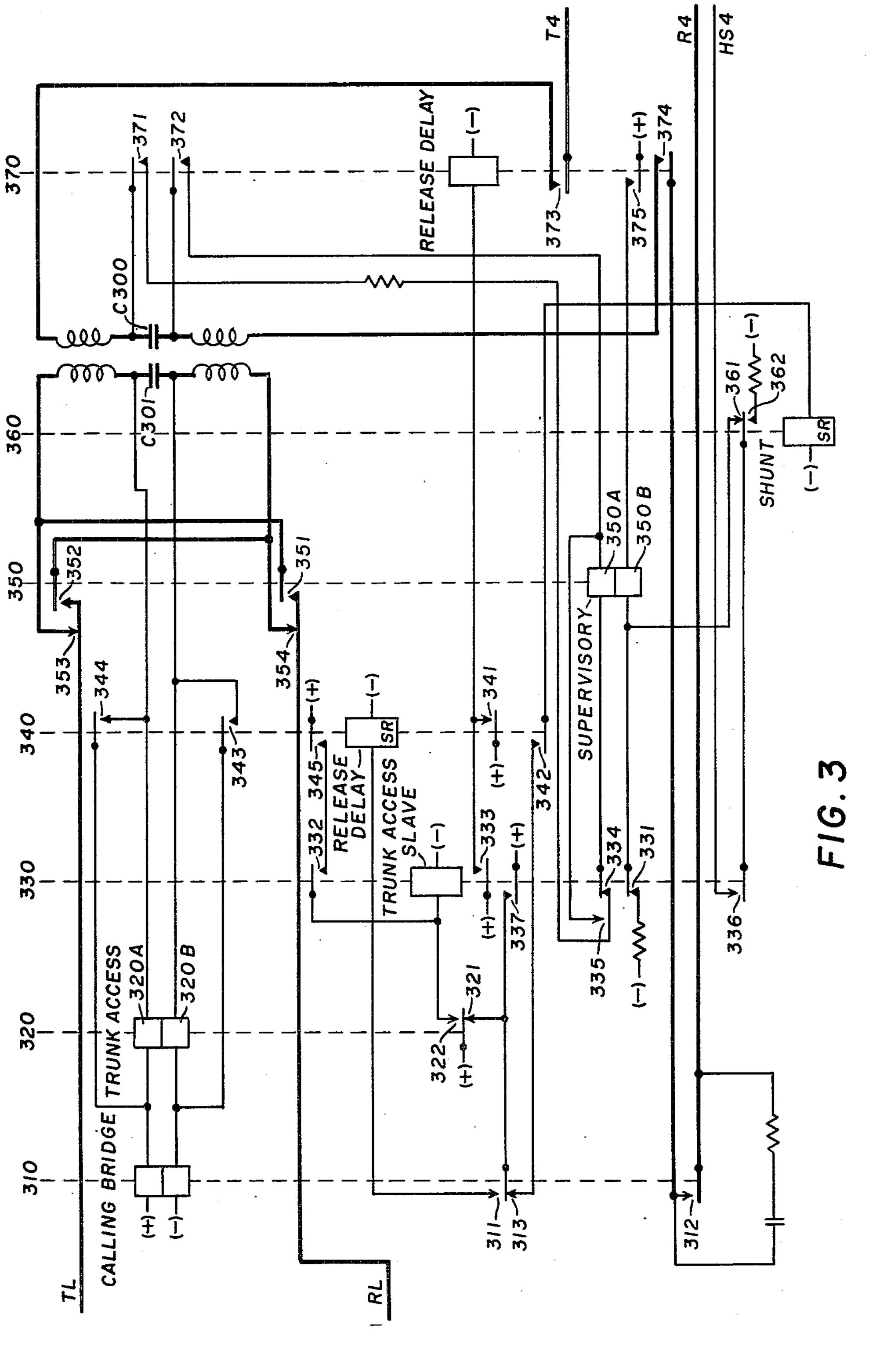
Figure 4:
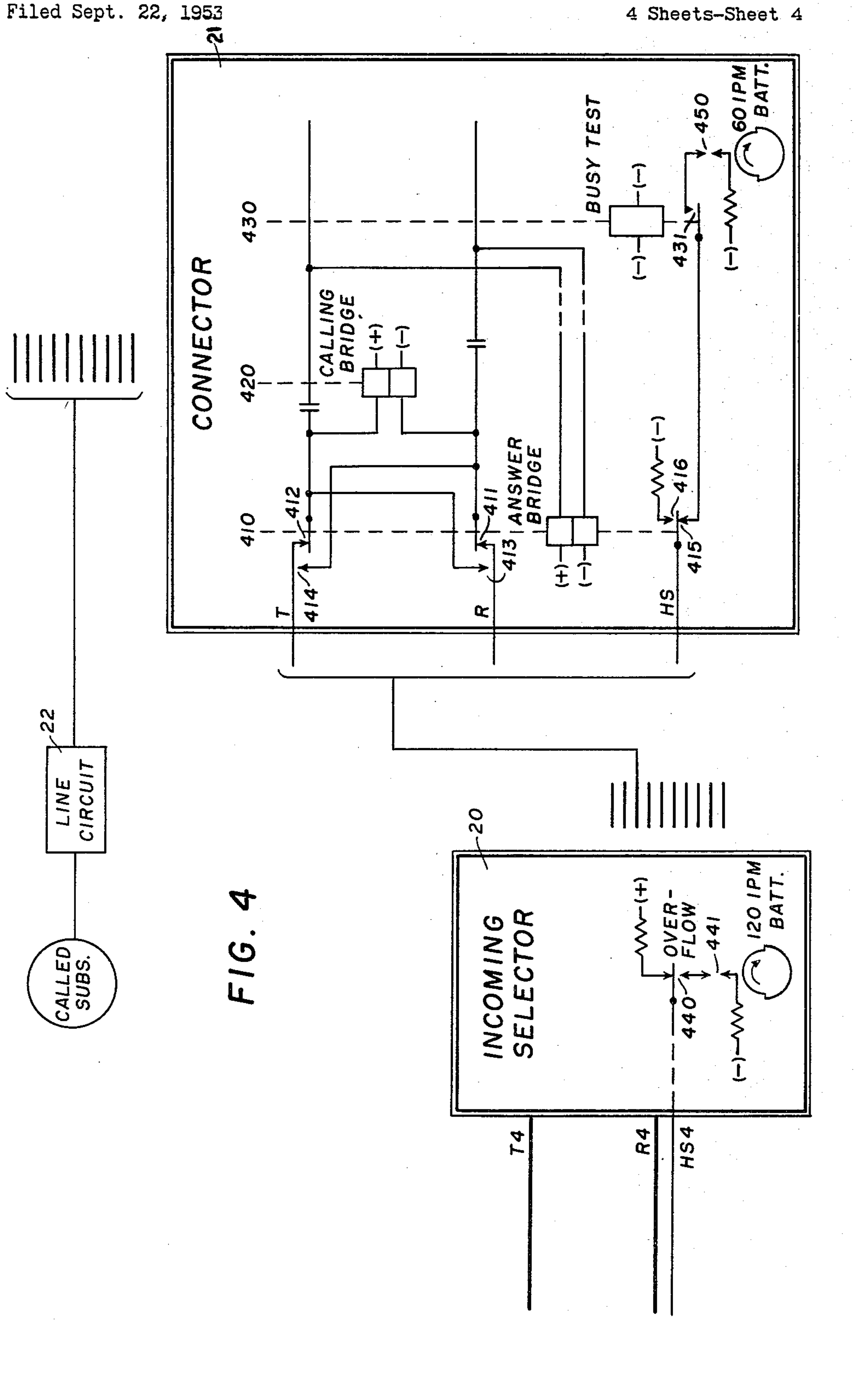

Fig. 3 is a circuit diagram of the trunk circuit in the distant exchange having the supervisory signal arrangement that is switched in accordance with the point of access used in the trunk circuit of Fig. 2; and Fig. 4 is a partial schematic diagram of the selector and connector circuits connected as succeeding circuits to the trunk circuit of Fig. 3 and showing in simplified form two supervisory signals of different origin and indication.

Figure 1:
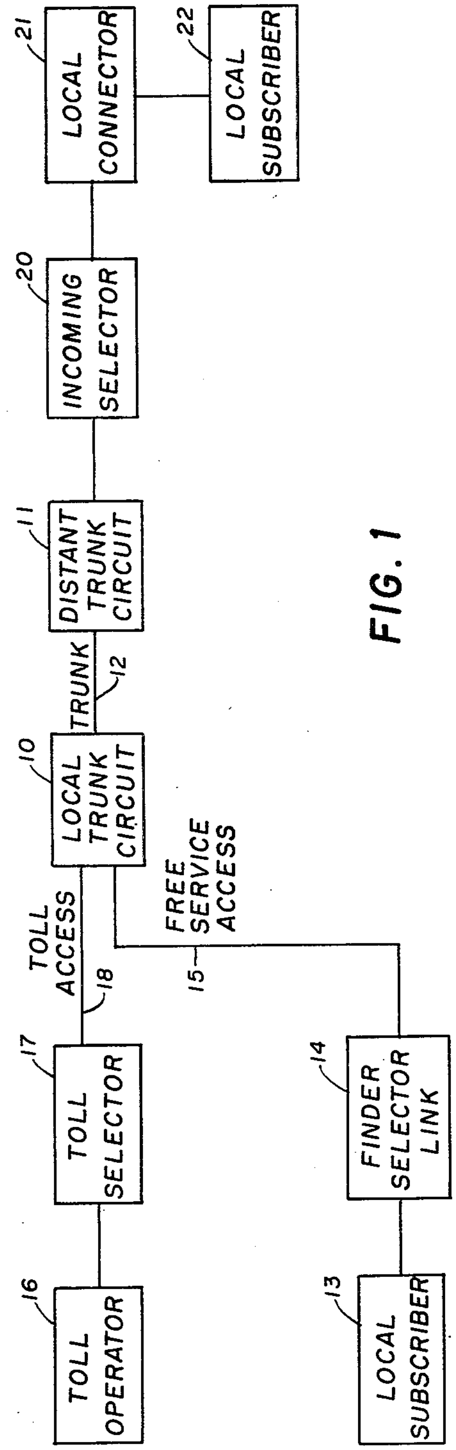
Fig. 1 is a block diagram of a simplified telephone system embodying the invention.

A telephone system utilizing the invention is shown by block outline in Fig. 1 and includes a trunk circuit 10 situated at a local exchange and a trunk circuit 11 situated at a distant exchange. Trunk circuits 10 and 11 are interconnected by means of the trunk line 12. The local exchange trunk circuit 10 is provided with two points of access to preceding circuits for calls to be transmitted over the trunk line 12 to the distant trunk circuit 11. For example, a local subscriber station 13 is shown in representative block form to be connectable by the finder selector link 14 over the so-called free service access line 15 to the trunk circuit 10. On the other hand, toll operator call originating circuits are shown in block outline at 16 to be connectable by means of the toll selector 17 and toll access line 18 to the local exchange trunk circuit 10.

As has been previously mentioned, the calls originating from the toll operator circuit 16 require a so-called flashing busy supervision signal whereas the calls originating from the local subscriber circuits 13 require only answer supervision, the busy signal to the subscriber being in the conventional form of an audible tone received over the talking conductors.

In the distant exchange, the distant trunk circuit 11 may be connected by succeeding circuits such as an incoming selector circuit 20 and a local connector circuit 21, to a local subscriber 22. The present description of a telephone system embodying the teachings of the invention will be limited to operations in one direction only from the local trunk circuit 10 to the distant trunk circuit 11. It should be understood, however, that the invention may be incorporated in any form of telephone system embodying other forms of loop type trunk circuits and lines connecting local and distant exchanges and that such signaling arrangements as described and claimed herein may be used in either direction over a trunk line depending upon the location of the origin of the supervisory signals (i. e., local or distant exchange).

*Operation of local trunk circuit of Fig. 2 on calls originating over the free service access*

Reference will now be made to Fig. 2 of the drawings for a detailed description of the local trunk circuit 10 having two points of access, namely, free service access 15 and toll access 18. The free service access conductors from the selector switch banks are shown as tip T, ring R, sleeve S and fourth auxiliary signal conductor HS. The toll access conductors are shown as tip T (toll), ring R (toll), sleeve S (toll), and fourth auxiliary conductor HS (toll).

Consider now the procedure in extending a call from the free service access selector banks through the trunk circuit of Fig. 2 and over the trunk line talking conductors TL and RL to the distant exchange trunk circuit shown in Fig. 3. The conventional closure of a loop over the incoming tip and ring talking conductors T and R from the selector banks completes a circuit to energize the calling bridge relay 240 closing the pulsing contacts 241 and closing contacts 242 to connect ground to energize the release delay relay 260. The energization of the release delay relay 260 closes contacts 261 to connect ground to the incoming sleeve conductors S and S (toll) of both the free service access and the toll access to the trunk circuit thus making the trunk circuit busy to all other calls seeking access thereto. The aforementioned energization of release delay relay 260 also closes contacts 262 to connect ground to energize a second release delay relay 270 which thereby closes contacts 271 to prepare a circuit for energizing the repeat coil shunt relay 250 upon the first of the dial impulses to be transmitted over the trunk line. At such time, contacts 243 of the calling bridge relay 240 will be reclosed to connect ground through operated contacts 271 to energize the shunt relay 250 which will remain operated due to its slow release characteristics during the entire period of time that dial impulses are transmitted. The energization of the shunt relay 250 closes the repeating coil shorting contacts 251 which improves the impulse transmission characteristics over the trunk line.

The aforementioned energization of release delay relay 260 also closes contacts 263 to connect ground to energize the lower winding 280A of supervisory relay 280. At the same time the upper winding 280B of supervisory relay 280 is connected through operated contacts 264, 265 and 241 together with either normal contacts 221 or operated contacts 272 to be in series with the trunk line talking conductors TL and RL for purposes of closing a loop across the trunk line to seize the distant trunk circuit calling bridge relay 310 shown in Fig. 3. The polarity of battery connections for the calling bridge relay 310, as will be later described in more detail, will be assumed to be such that the energizations of the upper winding 280B and the lower winding 280A of supervisory relay 280 are in opposition to each other to thereby prevent the operation of supervisory relay 280. With the supervisory relay 280 differentially energized and therefore not operated, contacts 283 remain closed to connect resistance ground to the auxiliary conductor HS for purposes of indicating to the preceding equipment that the call has not yet been answered, as will be later described in detail.

When the call is answered in the distant exchange, the polarity of connections for the calling bridge relay 310 to the trunk line conductors TL and RL will be reversed so that the supervisory relay 280 will no longer be differentially energized and will operate to close contacts 282 and connect resistance battery to the auxiliary conductors HS and HS (toll), thus indicating, in one manner, answer supervision to the preceding circuits. The aforementioned operation of the supervisory relay 280 also closes contacts 281 to connect ground through normal contacts 222 to thereby energize the reverse battery relay 230, it being understood that the toll access relay 220 has not been operated. The energization of the relay 230 thereby closes contacts 231, 232 and opens contacts 233, 234, for reversing the polarity of connections of the calling bridge relay 240 to the incoming talking conductors T and R from the free service selector banks. In this connection it is reminded that the present description is directed to the operation of the circuit when extending a call from the free service selector banks, under which conditions the toll access relay 220 is not operated.

The previously described operation of release delay relay 270, upon seizure of the trunk circuit, closes contacts 273 to connect an auxiliary holding ground to the lower winding 280A of the supervisory relay 280 and further opens contacts 274 and closes contacts 275 to connect resistance battery to operate the release supervisory relay 290. The operation of release supervisory relay 290 closes contacts 291 to prepare a connection of ground to the incoming sleeve conductors S and S (toll) in the event that the calling party hangs up before the called party at the distant exchange hangs up under which circumstances the release delay relay 270 would be restored to reclose normal contacts 276 and complete the prepared connection of the busy ground from operated contacts 291 to the aforementioned incoming sleeve conductors. The path for maintaining the energization of the release supervisory relay 290 after the release delay relay 270 restores is through normal contacts 274 and operated contacts 292 over the TL conductor of the trunk line to the battery of the calling bridge relay 310 in the distant exchange as connected through the answer supervisory reverse battery relay contacts, to be later described in detail.

The aforementioned description has explained the operation of the trunk circuit of Fig. 2 for connecting calls from the free service selector bank access over the incoming conductors T, R, S and HS, and it will be noted that the supervisory relay 280 is connected simply to close the loop over the trunk line talking conductors TL and RL to thereby seize the trunk circuit in the distant exchange in the conventional manner. Upon answering of the call in the distant exchange, the reverse battery relay 230 is energized to reverse the polarity of connections of the calling bridge relay 240 to the incoming talking conductors T and R to thereby provide answer supervision to the calling circuits including the free service access selector banks. In the event a busy condition is encountered, conventional busy tone may be connected over the trunk line conductors TL and RL and through the condensers C200 and C201 to the incoming talking conductors T and R.

*Operation of the local trunk circuit of Fig. 2 on calls originating from a toll operator*

Calls from the toll operator are extended over the toll access including incoming conductors T (toll), R (toll), S (toll), and HS (toll), and the arrangement is such as to close a loop to the calling bridge relay 240 in series with the upper winding 220A of the toll access relay 220 which is thereby operated upon seizure of the trunk circuit of Fig. 2 over the toll access. The aforementioned operation of toll access relay 220 closes preliminary make contacts 223 which prepares a circuit for maintaining the toll access relay 220 operated through its lower winding 220B from the ground on the sleeve conductors S and S (toll) as present upon the operation of the release delay relay 260 and closure of its contacts 261. The operation of the toll access relay 220 upon seizure also closes contacts 224 to connect ground from normal contacts 211 to the trunk line talking conductor RL through operated contacts 241 of the calling bridge relay 240. In this connection it should be pointed out that the calling bridge relay 240, release delay relays 260 and 270, shunt relay 250, supervisory relay 280 and release supervisory relay 290 all operate upon seizure of the trunk circuit of Fig. 2 from the toll access in the same manner as has been previously described in connection with seizure of the trunk circuit of Fig. 2 from the free service access. However, the successive operation of release delay relay 270 closes contacts 277 to connect ground to successively energize the release delay relay 210 which operates to open contacts 211 and close contacts 212, thus breaking the circuit previously connecting ground through normal contacts 211 and operated contacts 224 and 241 to the trunk line ring conductor RL. Since the release delay relay 210 can only be operated after the previous successive operation of the calling bridge relay 240 and release delay relays 260 and 270, it will be apparent that the operation of the toll access relay 220 at the moment of seizure of the trunk circuit of Fig. 2 will connect a momentary signal of ground on the trunk line ring conductor RL during the interval of time between the operation of relay 220 and the subsequent operation of relay 210. Such momentary signal thus obtained by the connection of ground to the ring conductor RL is indicative of the seizure of the trunk circuit of Fig. 2 by an incoming call over the toll access from the toll or intertoll selector banks over incoming conductors T (toll), R (toll), S (toll), and HS (toll).

The aforementioned operation of relay 210 also closes contacts 213 and opens contacts 214 and 215 to connect the incoming ring conductor R (toll) directly to the calling bridge relay 240 and disconnect the series connection of the upper winding 220A of the toll access relay 220. However, as previously mentioned, the toll access relay 220 remains operated over its lower winding 220B and operated contacts 223. With the toll access relay 220 thus operated during the entire seizure of the trunk circuit of Fig. 2 for a call over the toll access from the toll selector bank, contacts 222 will be opened to prevent the completion of the operating circuit to the reverse battery relay 230. Therefore, reverse battery answer supervision over the talking conductors T (toll) and R (toll) to the toll operator is prevented and in its place answer supervision is provided to the toll operator over the incoming auxiliary conductor HS (toll) when supervisory relay 280 is operated, as previously described, to thereby connect resistance battery thereto through operated contacts 282.

*Operation of the distant exchange trunk circuit of Fig. 3 upon extending a call thereto originating over the free service access of the trunk circuit of Fig. 2*

Referring now to Figs. 3 and 4 of the drawings, a brief previous mention has been made to the operation of the calling bridge 310 upon the closure of the loop over the incoming trunk line conductors TL and RL when the supervisory relay 280 of the trunk circuit of Fig. 2 is connected in the loop circuit through the operation of the release delay relay 260. It is now pointed out that the calling bridge relay 310 is operated in series with the windings 320A and 320B of the trunk access relay 320 which relay thereby becomes differentially energized and remains unoperated in the event that the call extended over the trunk line originates in the trunk circuit of Fig. 2 from the free service selector bank access. The operation of the calling bridge relay 310 closes contacts 311 to connect ground from normal contacts 321 to energize the release delay relay 340. The operation of calling bridge relay 310 also closes the pulsing contacts 312 to prepare a circuit for seizing the succeeding equipment of Fig. 4 over the talking conductors T4 and R4 in the conventional manner. The operation of the release delay relay 340 closes contacts 341 to connect ground to energize the release delay relay 370 and thereby close contacts 371, 372, 373, 374 and 375 to complete the loop circuit for seizing the succeeding equipment.

The closure of contacts 371 and 372 connects the upper winding 350A of the supervisory relay 350 through normal contacts 334 in series with the loop to the succeeding circuits, and the closure of contacts 375 connects ground to energize the lower winding 350B of supervisory relay 350 in series with the resistance battery as connected through normal contacts 331. The connections of talking battery over the succeeding circuit talking conductors T4 and R4, as for example, from the calling bridge relay 420 of the local connector 21, are such that the supervisory relay 350 is differentially energized and therefore does not operate at this time.

Upon receipt of the first impulse of the train of dial impulses over the trunk line to the succeeding equipment, contacts 313 are reclosed to operate the shunt relay 360 from ground through normal contacts 321, 313, and operated contacts 342. The shunt relay 360 remains operated throughout the entire train of dial impulses and then restores due to its slow release characteristics.

The previously mentioned operation of release delay relay 340 also closes contacts 343 and 344 to connect the calling bridge relay 310 directly to the incoming trunk line talking conductors TL and RL, thus disconnecting the series connection of the trunk access relay 320 and further preventing any operation of the trunk access relay.

Upon the answering of the call, the answer bridge relay 410 in the connector circuit 21 of Fig. 4 is conventionally operated to open contacts 411, 412 and close contacts 413, 414 to thereby reverse the polarity of the connections of the calling bridge relay 420 over the talking conductors to the incoming selector and the talking conductors T4 and R4 to the trunk circuit of Fig. 3 which reverses the direction of the current flow through the upper winding 350A of the supervisory relay 350, thus operating the supervisory relay 350. The operation of the supervisory relay 350 closes contacts 351, 352 and opens contacts 353, 354 to reverse the polarity of the connections of the calling bridge relay 310 to the trunk line talking conductors TL and RL thus providing answer supervision back over the trunk line to the local exchange trunk circuit of Fig. 2. It will be recalled from the previous description of the trunk circuit of Fig. 2 that the reversal of battery on the trunk line talking conductors TL and RL is effective to cause the operation of the reverse battery relay 230 for reversing the polarity of the connections of the calling bridge relay 240 to the free service access talking conductors T and R when the call originated over the free service access to the trunk circuit of Fig. 2.

In the event a busy condition is encountered by the connector of Fig. 4, busy tone will be returned in the usual manner (not shown) over the talking conductors and condensers C300, C301, C200 and C201 to the calling party when the call is from the free service access selector banks.

*Operation of the trunk circuit of Fig. 3 on calls extended thereto over the trunk line from the trunk circuit of Fig. 2 as originating over the toll access*

As previously described in connection with Fig. 2 of the drawings, when a call originates from the toll or intertoll selector banks access to the trunk circuit of Fig. 2, a momentary signal comprising connection of ground to the trunk line talking conductor RL is provided during seizure of the trunk circuits of Fig. 2 and Fig. 3. The momentary connection of ground to the conductor RL unbalances the loop connections to the calling bridge relay 310 in series with the differential trunk access relay 320 so that relay 320 is operated at the time of seizure of the trunk circuit of Fig. 3 under these conditions. The operation of the trunk access relay 320 closes contacts 322 to connect ground to energize the trunk access slave relay 330 which, in operating, closes contacts 332 to provide a holding circuit for itself in series with ground through operated contacts 345 of the release delay relay 340. Thus, in such manner, the trunk access slave relay 330 is operated by the momentary ground connections on the trunk line conductor RL and remains operated during the entire seizure of the trunk circuit of Fig. 3 to indicate that the call originated in the trunk circuit of Fig. 2 over the toll access.

The operation of the trunk access slave relay 330 closes contacts 333 to connect ground to operate the release delay relay 370 and the subsequent operations of shunt relay 360 and release delay relay 340 are as previously described. However, with the trunk access slave relay 330 operated, normal contacts 334 are opened and contacts 335 are closed to short circuit the connection of the upper winding 350A of the supervisory relay 350 in the loop circuit to the talking conductors T4 and R4 of the succeeding circuits. The operation of the trunk access slave relay 330 also opens contacts 331 to prevent the completion of the circuit through the lower winding 350B of the supervisory relay 350, it being understood that the shunt relay 360 is operated during the pulsing interval to thereby open contacts 361. With the shunt relay 360 operated, contacts 362 are closed to connect resistance battery through operated contacts 336 to the auxiliary conductor HS4 connecting with the succeeding circuits including the incoming selector of Fig. 4, thus indicating when desired, that the call extended over the trunk line originated over the toll access to the trunk circuit of Fig. 2.

It should be understood that calls originating over the toll access to the trunk circuit of Fig. 2 are from a toll operator and do not require answer supervision signaling over the talking conductors. However, should a busy condition be encountered in either the incoming selector 20 or the connector 21 of Fig. 4 in the distant exchange, it is desirable to indicate to the toll operator that such busy condition has been encountered. It has been customary to provide a so-called flashing busy signal to the toll operator which may flash at different speeds indicative of the particular circuit or circuits in which the busy connection is encountered. For example, should the incoming selector 20 of Fig. 4 encounter a busy level, contacts 440 will be closed to connect resistance battery through intermittently operated contacts 441 at the rate of 120 impulses per minute to the auxiliary conductor HS4. It should be noted that the auxiliary conductor HS4 is independent of the talking conductors T4 and R4 of the succeeding circuits. Such intermittent connection of battery to the auxiliary conductor HS4 is connected through operated contacts 336 of the trunk access slave relay 330 and normal contacts 361 of the shunt relay 360 when such relay restores at the end of the impulsing period, to cause the lower winding 350B of the supervisory relay to be intermittently energized. The circuit for intermittently energizing the supervisory relay 350 may thus be traced from ground through operated contacts 375, normal contacts 361, operated contacts 336, auxiliary conductor HS4, operated contacts 440 and intermittently operated contacts 441 to resistance battery. In such manner the supervisory relay 350 is intermittently energized to intermittently reverse the polarity of battery connections for the calling bridge relay 310 to the trunk line talking conductors TL and RL, thus causing a similar intermittent operation of the supervisory relay 280 in the local exchange trunk circuit of Fig. 2. Such intermittent operation of the supervisory relay 280 alternately connects resistance battery and resistance ground through the operation of contacts 282 and 283 to the incoming auxiliary conductor HS (toll) extending to the toll operator over the toll access of the trunk circuit of Fig. 2. The toll operator is provided with suitable signaling means (not shown) responsive to the intermittent connections of battery and ground to the conductor HS (toll) to thereby produce a flashing signal indicative of the busy condition encountered in the selector of Fig. 4 at the distant exchange. It will be recalled that the toll access relay 220 is operated when the call is from the toll operator so that the reverse battery relay 230 will not be flashed by the intermittent operation of the supervisory relay 280 since normal contacts 222 are at such times open.

In the event that a busy condition is encountered in the connector circuit 21 of the distant exchange, the busy test relay 430 will be operated in the usual manner to close contacts 431 and connect battery from the intermittently operated contacts 450 at the rate of 60 impulses per minute and to the HS conductor through the normal contacts 415 of the answer bridge relay 410. Such intermittent connection of battery at the rate of 60 impulses per minute to the HS conductor of the connector is also connected through the incoming selector of Fig. 4 to the auxiliary conductor HS4 and through operated contacts 336 and normal contacts 361 to intermittently operate the supervisory relay 350. Thus, in such manner, the polarity of connections of the calling bridge relay 310 to the trunk line talking conductors TL and RL is intermittently reversed at the rate of 60 impulses per minute to correspondingly energize the supervisory relay 280 of the trunk circuit of Fig. 2 and provide a flashing signal to the toll operator over the HS (toll) conductor, as previously described, to thereby indicate a busy condition in the connector circuit 21.

In the event that the connection is completed and no busy condition is encountered, the answer bridge relay 410 is operated to connect resistance battery through operated contacts 416 to the HS conductor of the connector and to the HS4 conductor of the incoming selector. Such steady connection of resistance battery to the conductor HS4 causes a steady energization of the supervisory relay 350 through its lower winding 350B and operated contacts 375, normal contacts 361 and operated contacts 336. The steady energization of the supervisory relay 350 reverses the polarity of connections of the calling bridge relay 310 to the trunk line talking conductors TL and RL which causes the steady energization of relay 280 in the trunk circuit of Fig. 2 and connects resistance battery through operated contacts 282 to the HS (toll) conductor to the toll operator thus providing answer supervision.

It is believed that the operation of the supervisory signaling arrangements of the invention should now be understood. It may be desirable to again point out that the trunk circuit of Fig. 2 is provided with circuit arrangements whereby it may be seized over either a free service access or a toll operator access, and is further provided with means including the toll access relay 220 for providing a momentary signal over the trunk line indicative of its seizure over the toll access. The trunk circuit at the distant exchange on the other hand, is provided with a trunk access slave relay 330 responsive to the momentary signal over the trunk line upon seizure to be operated to indicate a call over the toll access of the trunk circuit of Fig. 2, thereby completing circuits to connect the reverse battery supervisory relay 350 to be responsive to busy conditions as indicated by intermittent connections of resistance battery to the conductor HS4 exclusive of the talking conductors of the succeeding circuits. When the call from the trunk circuit of Fig. 2 originates over the free service access, the trunk access slave relay 330 is not operated and the supervisory relay 350 is then connected to the talking conductors T4 and R4 of the succeeding circuits to thereby be operated in response to answer supervision over the talking conductors of such succeeding circuits. This answer supervision is then indicated by reverse battery connections over the talking conductors of the trunk line and the trunk circuit of the local exchange to the preceding circuits.

Various modifications may be made within the spirit of the invention and the scope of the appended claims and it should be specifically understood that the switching arrangements for the various supervisory relays as described are not limited to any particular form of one-way or two-way trunk circuit.

What we claim is:

1. In a telephone system, a first exchange, a second exchange, a first trunk circuit in said first exchange, a first access to said first trunk circuit, a second access to said first trunk circuit, means to seize said first trunk circuit over said first access, means to seize said first trunk circuit over said second access, a second trunk circuit in said second exchange, a trunk line interconnecting said first and second trunk circuits, means responsive to seizure of said first trunk circuit to seize said second trunk circuit over said trunk line, supervisory signaling means in said second trunk circuit to be operated to return a supervisory signal over said trunk line to said first trunk circuit at times during seizure of said first and second trunk circuits, said first trunk circuit having means responsive to seizure over said second access to transmit a momentary signal over said trunk line to said second trunk circuit upon seizure of said second trunk circuit, first and second supervisory signal paths extending to said second trunk circuit, means to apply a steady supervisory signal to said first path, means to apply an intermittent supervisory signal to said second path, means to normally connect said supervisory signaling means to be operated by the steady supervisory signal over said first path at any time during seizure of said second trunk circuit, and means responsive to said momentary signal upon seizure of said second trunk circuit for connecting said supervisory signal means to be operated by the intermittent supervisory signal over said second path at any time during that particular seizure of said second trunk circuit.

2. In a telephone system, a first exchange, a second exchange, a first trunk circuit in said first exchange, a first access to said first trunk circuit, a second access to said first trunk circuit, means to seize said first trunk circuit over said first access, means to seize said first trunk circuit over said second access, a second trunk circuit in said second exchange, a trunk line interconnecting said first and second trunk circuits, means responsive to seizure of said first trunk circuit to seize said second trunk circuit over said trunk line, supervisory signaling means in said second trunk circuit to be operated to return a supervisory signal over the talking conductors of said trunk line to said first trunk circuit at times during seizure of said first and second trunk circuits, said first trunk circuit having means responsive to seizure over said second access to transmit a momentary signal over said trunk line to said second trunk circuit upon seizure of said second trunk circuit, first and second supervisory signal paths extending to said second trunk circuit, means to apply a steady supervisory signal to said first path, means to apply an intermittent supervisory signal to said second path, means to normally connect said supervisory signaling means to be operated by the steady supervisory signal over said first path at any time during seizure of said second trunk circuit, and means responsive to said momentary signal upon seizure of said second trunk circuit for connecting said supervisory signal means to be operated by the intermittent supervisory signal over said second path at any time during that particular seizure of said second trunk circuit.

3. In a telephone system, a first exchange, a second exchange, a first trunk circuit in said first exchange, a first access to said first trunk circuit, a second access to said first trunk circuit, means to seize said first trunk circuit over said first access, means to seize said first trunk circuit over said second access, a second trunk circuit in said second exchange, a trunk line interconnecting said first and second trunk circuits, means responsive to seizure of said first trunk circuit to seize said second trunk circuit over said trunk line, supervisory signaling means in said second trunk circuit to be operated to return a supervisory signal over said trunk line to said first trunk circuit at times during seizure of said first and second trunk circuits, said first trunk circuit having means responsive to seizure over said second access to transmit a momentary signal over said trunk line to said second trunk circuit upon seizure of said second trunk circuit, a first supervisory signal path including talking conductors extending from succeeding circuits to said second trunk circuit, a second supervisory signal path including a conductor exclusive of talking conductors extending from succeeding circuits to said second trunk circuit, means responsive to answer of a call to connect a steady supervisory signal over said first path, means responsive to a busy condition in succeeding circuits to connect an intermittent supervisory signal over said second path, means to normally connect said supervisory signaling means to said first path to be operated by the steady supervisory signal at any time during seizure of said second trunk circuit, and means responsive to said momentary signal upon seizure of said second trunk circuit for connecting said supervisory signal means to said second path to be operated by the intermittent supervisory signal at any time during that particular seizure of said second trunk circuit.

4. In a telephone system, a first exchange, a second exchange, a first trunk circuit in said first exchange, a first access to said first trunk circuit, a second access to said first trunk circuit, means to seize said first trunk circuit over said first access, means to seize said first trunk circuit over said second access, a second trunk circuit in said second exchange, a trunk line interconnecting said first and second trunk circuits, means responsive to seizure of said first trunk circuit to seize said second trunk circuit over said trunk line, supervisory signaling means in said second trunk circuit to be operated to return a supervisory signal over the talking conductors of said trunk line to said first trunk circuit at times during seizure of said first and second trunk circuits, said first trunk circuit having means responsive to seizure over said second access to transmit a momentary signal over said trunk line to said second trunk circuit upon seizure of said second trunk circuit, a first supervisory signal path including talking conductors extending from succeeding circuits to said second trunk circuit, a second supervisory signal path including a conductor exclusive of talking conductors extending from succeeding circuits to said second trunk circuit, means responsive to answer of a call to connect a steady supervisory signal over said first path, means responsive to a busy condition in succeeding circuits to connect an intermittent supervisory signal over said second path, means to normally connect said supervisory signaling means to said first path to be operated by the steady supervisory signal at any time during seizure of said second trunk circuit, and means responsive to said momentary signal upon seizure of said second trunk circuit for connecting said supervisory signal means to said second path to be operated by the intermittent supervisory signal at any time during that particular seizure of said second trunk circuit.

5. In a telephone system, a first exchange, a second exchange, a first trunk circuit in said first exchange, a first access to said first trunk circuit, a second access to said trunk circuit, means to seize said first trunk circuit over said first access, means to seize said first trunk circuit over said second access, a second trunk circuit in said second exchange, a trunk line interconnecting said first and second trunk circuits, means to connect talking batery to the trunk line, means responsive to seizure of said first trunk circuit to seize said second trunk circuit over said trunk line, supervisory signaling means in said second trunk circuit adapted to be operated to reverse the polarity of talking battery and thereby return a supervisory signal over the talking conductors of said trunk line to said first trunk circuit during seizure of said first and second trunk circuits, said first trunk circuit having means responsive to seizure over said second access to transmit a momentary signal over said trunk line to said second trunk circuit upon seizure of said second trunk circuit, first and second supervisory signal paths extending to said second trunk circuit, means to apply a steady supervisory signal to said first path, means to apply an intermittent supervisory signal to said second path, means to normally connect said supervisory signaling means to said first path to be operated by the steady supervisory signal over said first path during seizure of said second trunk circuit, and means responsive to said momentary signal upon seizure of said second trunk circuit for connecting said supervisory signal means to said second path to be operated by the intermittent supervisory signal over said second path during that particular seizure of said second trunk circuit.

6. In a telephone system, a first exchange, a second exchange, a first trunk circuit in said first exchange, a first access to said first trunk circuit, a second access to said first trunk circuit, means to seize said first trunk circuit over said first access, means to seize said first trunk circuit over said second access, a second trunk circuit in said second exchange, a trunk line interconnecting said first and second trunk circuits, means to connect talking battery to the trunk line, means responsive to seizure of said first trunk circuit to seize said second trunk circuit over said trunk line, supervisory signaling means in said second trunk circuit to be operated to reverse the polarity of talking battery and thereby return a supervisory signal over the talking conductors of said trunk line to said first trunk circuit at times during seizure of said first and second trunk circuits, said first trunk circuit having means responsive to seizure over said second access to transmit a momentary signal over said trunk line to said second trunk circuit upon seizure of said second trunk circuit, a first supervisory signal path including talking conductors extending from succeeding circuits to said second trunk circuit, a secondary supervisory signal path including a conductor exclusive of talking conductors extending from succeeding circuits to said second trunk circuit, means responsive to answer of a call to connect a steady supervisory signal over said first path, means responsive to a busy condition in succeeding circuits to connect an intermittent supervisory signal over said second path, means to normally connect said supervisory signaling means to said first path to be operated by the steady supervisory signal at any time during seizure of said second trunk circuit, and means responsive to said momentary signal upon seizure of said second trunk circuit for connecting said supervisory signal means to said second path to be operated by the intermittent supervisory signal over said second path at any time during that particular seizure of said second trunk circuit.

References Cited in the file of this patent

UNITED STATES PATENTS

| | | |
|---|---|---|
| 2,428,550 | Burgener | Oct. 7, 1947 |
| 2,607,854 | Bakker | Aug. 19, 1952 |